United States Patent [19]

Suzuki

[11] 3,955,886

[45] May 11, 1976

[54] MOTION PICTURE CAMERA

[75] Inventor: Takeshi Suzuki, Okazaki, Japan

[73] Assignee: Minolta Camera Kabushiki Kaisha, Japan

[22] Filed: Mar. 11, 1975

[21] Appl. No.: 557,389

Related U.S. Application Data

[63] Continuation of Ser. No. 452,270, March 18, 1974, which is a continuation of Ser. No. 294,867, Oct. 4, 1972, abandoned.

[30] Foreign Application Priority Data

Oct. 4, 1971 Japan............................... 46-91008
Dec. 22, 1971 Japan............................. 46-121306

[52] U.S. Cl............................... 352/137; 352/169
[51] Int. Cl.² ........................................ G03B 19/18
[58] Field of Search........................... 352/137, 169

[56] References Cited
UNITED STATES PATENTS

| | | | |
|---|---|---|---|
| 3,489,492 | 1/1970 | Kobler et al. | 352/169 |
| 3,601,481 | 8/1971 | Kessler | 352/169 |
| 3,603,678 | 9/1971 | Anderl et al. | 352/169 |

FOREIGN PATENTS OR APPLICATIONS 39-18733  9/1964  Japan

Primary Examiner—L. T. Hix
Assistant Examiner—Russell E. Adams, Jr.
Attorney, Agent, or Firm—Craig & Antonelli

[57] ABSTRACT

In an improved motion picture camera capable of continuous shooting and one-frame shooting, by employing a novel circuit arrangement, the period of one frame shooting can be shortened, and the stability of operation against a wide range of the environmental temperature change can be attained, and also the electric power in the circuit can be conserved.

14 Claims, 6 Drawing Figures

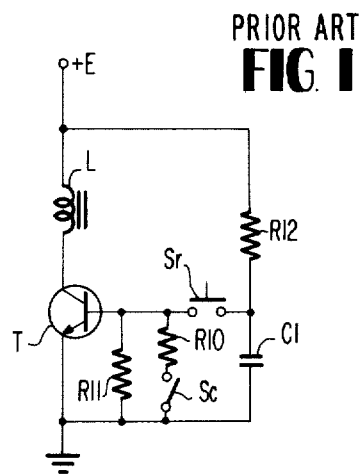
PRIOR ART
FIG. 1
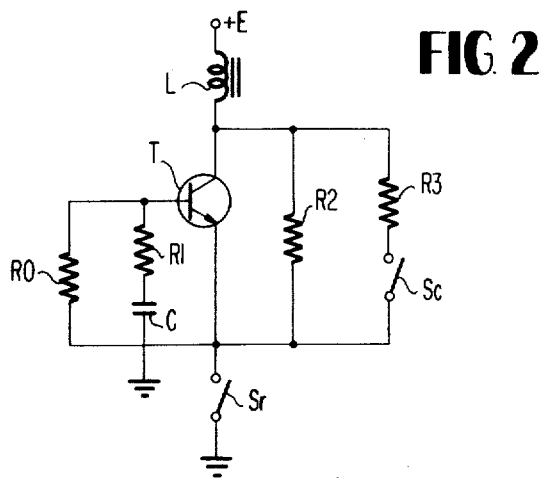
FIG. 2
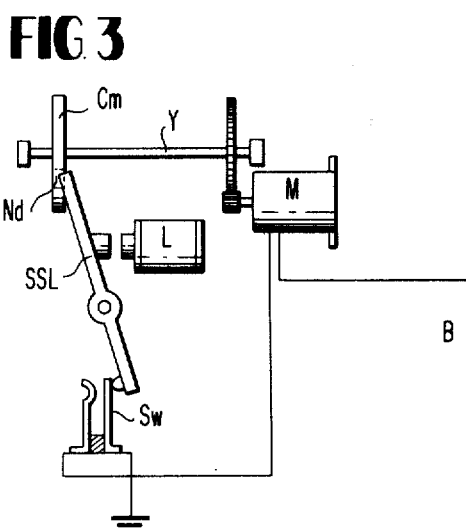
FIG. 3
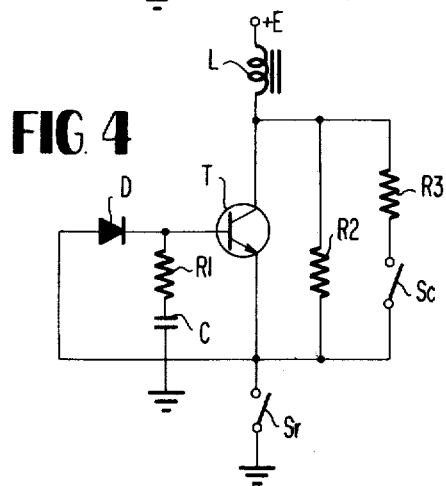
FIG. 4
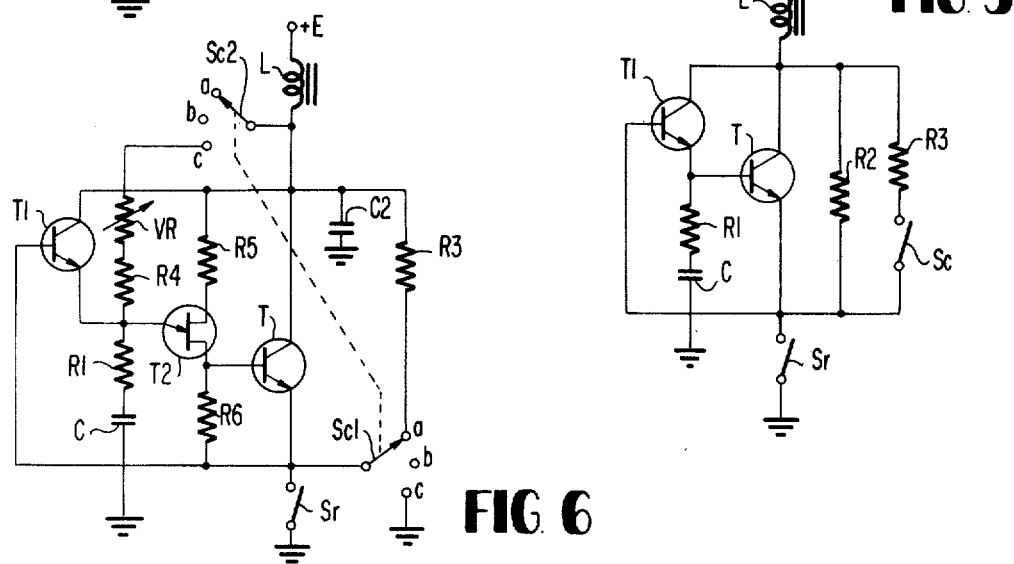
FIG. 5
FIG. 6

MOTION PICTURE CAMERA

This is a continuation of application Ser. No. 452,270, filed Mar. 18, 1974 which is a continuation of application Ser. No. 294,867 Oct. 4, 1972, now abaondoned.

BACKGROUND OF THE INVENTION

This invention relates to an improvement in a motion picture camera capable of continuous shooting, as well as one-frame shooting. More particularly, this invention concerns a motion picture camera, wherein an improved electric circuit for switching between the continuous shooting operation and the one-frame shooting operation is provided for better performance.

FIG. 1 shows the principal part of a typical prior art electric circuit for a motion picture camera capable of both continuous shooting and one-frame shooting. In FIG. 1, a changeover switch Sc is provided for switching between continuous shooting and one-frame shooting. This switch Sc is closed for one-frame shooting and is opened for continuous shooting. A release switch Sr is interlocked with the shutter-release button (not shown) of the camera so as to be closed during releasing of the shutter. An electromagnet L is provided for driving the shutter-stop lever which is to be engaged into an indent of a cam linking shutter blade, so as to stop rotation of the cam, when deenergized. Upon energization, the electromagnet L releases the cam and permits the shutter blade to be rotated by a motor. A transistor T is provided for controlling the electromagnet L. R10, R11, and R12 are resistors, and C is a capacitor. The resistance of the resistor R10 is selected to be far smaller than that of resistor R11. A terminal +E is to be connected to the positive end of a D.C. power source.

In the continuous shooting condition, when the release switch Sr is closed, the base of the transistor T receives a voltage which is obtained by dividing the source voltage by the drop in resistors R11 and R12, so that the collector current of the transistor T is increased to energize the electromagnet L and permit the shutter blade to rotate continuously. The resistor R11 is sufficiently large that capacitor C1 discharges over a very long period of time to permit continuous operation.

In the one-frame shooting, before closing the release switch Sr, the capacitor C1 has been charged to to the level of a voltage of the power source applied to the terminal +E. When the release switch Sr is closed, the voltage of the capacitor C is impressed to the base of the transistor T and turns it "on", and then the charge of the capacitor C1 is discharged through the resistors R11 and R10 at a certain short time until the voltage at the base of the transistor T is reduced to the level of the aforementioned divided voltage. Due to the decrease of the base voltage of the transistor T, the collector current of the transistor T is reduced and hence, the current of the electromagnet L decreases within the short time. Accordingly, the shutter-stop lever stops the shutter blade.

The lapse time from the close of the switch Sr to the finish of decrease of the collector current of the transistor T is dependent on a discharging time constant C1.R10, the effective impedance value of the parallel combination of R10 and R11 being substantially R10. The lapse time should be short enough to release the shutter-stop lever SSL from the indent of the cam Cm sufficiently before completion of each whole period of motion of the one-frame shooting. For attaining such short lapse time, the resistance of the resistor R10 should be small. On the other hand, in the one-frame shooting, it is necessary that the collector current of the transistor T decreases to a very small level, and therefore, the ratio R12/R10 should be sufficiently large. However, in repetition of one-frame shootings, it is necessary that the capacitor C is sufficiently charged up during every period of closing of the release switch Sr. For this reason the resistance of the resistor R12, which defines the time constant for charging the capacitor C1, should not be large. These are difficulties in designing the conventional circuit shown in FIG. 1.

Moreover, there is a problem due to instability of the transistor T. In the circuit of FIG. 1, the small amount of collector current of the transistor T remains even during the one-frame shooting operation. A residual collector-current, namely the current of the electromagnet L, is considerably influenced by the environmental temperature. Accordingly, the lapse time from the close of the release switch Sr to the deenergization of the electromagnet L is influenced by the temperature. That is to say, in cold temperatures, the lapse time becomes larger, causing the shutter-stop lever to release the shutter for too long a time. Such unexpected long release of the shutter causes defective two-frame shooting instead of the one-frame shooting. Furthermore, in the circuit of FIG. 1, the residual current flows through the electromagnet L and the transistor T even in the continuous shooting operation. The residual current becomes excessively large at high temperature and wastes the electric power of the battery.

SUMMARY OF THE INVENTION

This invention purports to eliminate the aforementioned shortcomings of the conventional motion picture camera by improving the electric circuit constitution thereof.

It is therefore an object of the present invention to provide a control circuit for a motion picture camera capable of more effectively controlling both the continuous operating condition and one-frame operating condition of the camera.

It is another object of the present invention to provide a control circuit of the type described which avoids or otherwise eliminates the difficulties and disadvantages inherent in the prior art.

It is a further object of the present invention to provide a control circuit of the type described which is stable in operation and provides for quick response in the one-frame operating condition.

A motion picture camera is provided in accordance with the invention including an optical system, a film driving mechanism, a rotatable shutter for periodic exposure to the film, an electromagnet for controlling the rotation of the shutter by its energization, and an electronic circuit for controlling the electromagnet, wherein the electronic control circuit is characterized in: (1) that the electromagnet, a transistor and a release switch are connected in series across both ends of a D.C. power source, the release switch being interlocked with a shutter release button to be closed when the button is pressed down for releasing. (2) that a by-pass branch having a resistor and a switch for selecting between continuous shooting and one-frame shooting is provided for bypassing from the collector to the emitter of the transistor when the continuous shooting is selected, and (3) that a time constant circuit consisting of a series connection of a capacitor and a resistor is connected between the base of the transistor and the end of the D.C. power source to which the emitter of the transistor is connected.

These and other objects, features and advantages of the present invention will become more apparent from the following detailed description, when taken with the accompanying drawings.

BRIEF EXPLANATION OF THE DRAWING

FIG. 1 is a circuit diagram of a conventional motion picture camera;

FIG. 2 is a circuit diagram of a motion picture camera embodying the present invention;

FIG. 3 is a schematic side view of a portion of the motion picture camera embodying the circuit of FIG. 2;

FIGS. 4 to 6 are circuit diagrams of other modified examples of motion picture camera circuits, respectively, embodying the present invention.

DETAILED DESCRIPTION OF THE INVENTION

In FIG. 2, a selection switch Sc is provided for switching between continuous shooting and one-frame shooting, being closed for continuous shooting and opened for one-frame shooting. A release switch Sr is interlocked with a shutter release button (not shown) of the camera so as to be closed during releasing of the shutter. As shown in FIG. 3, an electromagnet L is arranged so as to drive the shutter-stop lever SSL, which is to be engaged into an indent Nd of a cam Cm. The cam Cm is connected to a shaft Y of shutter blade (not shown) of the motion picture camera, so as to instantly stop the rotation of the shutter blade in the proper phase when catching the shutter-stop lever SSL during deenergization of the electromagnet L.

Upon energization of the electromagnet L, the shutter-stop lever SSL releases the cam Cm and permits the shutter blade to rotate. As shown in FIG. 3, a switch Sw is provided so as to be closed when pressed by a part of the shutter-stop lever SSL, while the electromagnet L is energized. By closing the switch Sw, a motor M for driving the shutter blade is electrified and drives the shaft Y, and hence, the shutter blade and the cam Cm are driven also. A transistor T is provided for controlling the electromagnet L, which is connected between the collector of the transistor T and a positive source terminal +E. The terminal +E is connected to the positive end of a known D.C. power source (not shown), the negative end of which is grounded. The emitter of the transistor T is grounded through the release switch Sr. A resistor R2, and a series connection of the resistor R3 and the changeover switch Sc, are connected between the collector and the emitter of the transistor T. The resistance of the resistor R3 is selected so that R2 is very much larger than R3. The base of the transistor T is grounded through a time constant circuit consisting of a series connection of a resistor R1 and the capacitor C. A resistor R0 is connected between the base and the emitter of the transistor T, as a charging path for the capacitor C.

The operation and function of the camera described with reference to FIGS. 2 and 3 are as follows:

Before the release button is pressed, the release switch Sr has been open, and accordingly, the capacitor C is charged up to the level of a source voltage through the electromagnet L, the resistor R2 (paralleled by the resistor R3 when the switch Sc is closed), the resistor R0 and the resistor R1.

When the switch Sc is closed for continuous shooting and the release switch Sr is closed by pressing the release button, a current flows through the electromagnet L, the paralleled resistors R2 and R3 and the release switch Sr, and energizes the electromagnet L. Accordingly, the shutter-stop lever SSL releases the cam Cm and closes the motor switch Sw, and the shutter blade rotates for continuous shooting. In order to allow a sufficient current to flow through the electromagnet, the resistor R3 should have a small value.

When the switch Sc is opened for one-frame shooting, and the release switch Sr is not closed yet, the electromagnet is connected in series with the resistor R2. Since the resistor R2 is selected to be of high resistance, the current through the electromagnet L is very small and the electromagnet L remains deenergized. Then, upon closing the release switch Sr, the charged-up voltage of the capacitor C is impressed on the base of the transistor T, accordingly, rendering the transistor conductive and providing a relatively low resistance path in series with electromagnet L. Subsequently, the charge of the capacitor C is discharged through the resistors R1, R0, and the switch Sr, at a predetermined rapid discharging rate. As a result, the collector current of the transistor T decreases at said rapid discharging rate. Thus, the electromagnet L is energized for a predetermined limited time. Accordingly, the shutter-stop lever SSL is disengaged from the indent of the cam Cm and allows the cam to rotate for one turn for completion of the one-frame shooting operation. Simultaneously, the motor switch Sw is closed for the limited time, and accordingly, the shutter blade rotates for one turn to complete the one-frame shooting operation.

As can be understood from the foregoing description, in the continuous shooting of the motion picture camera of the present invention, a sufficient amount of energizing current for actuating the electromagnet L flows through the transistor T for a short transient period right after closing the release switch Sr, and the energizing current does not flow through the transistor T after the circuit reaches a steady state. Accordingly, the conductive state or the cut-off state of the transistor T makes no difference during the steady state of the continuous shooting operation. This allows a wide range of selection of the values of the resistors R0 and R1. Therefore, these resistances can be selected so as to enable sufficient energizing current to flow through the electromagnet L, and to desirably shorten the time constant of charging of the capacitor C through the resistor R2.

As aforementioned, in the continuous shooting operation, a sufficient rush energizing current flows through the electromagnet L right after closing the release switch Sr, and the current is soon reduced to a smaller steady state current when a transient phenomenon is over. This is suitable for the requirement for the electromagnet L wherein an initial actuating current for attracting an armature should be considerably larger than a holding current in steady state for retaining the attracted armature in an attracted position.

Moreover, in the one-frame shooting operation, the transistor T is completely cut off at its emitter circuit during the charging time which lasts from the opening of the release switch Sr to the subsequent closing of the release switch Sr. Accordingly, there is no anxiety that high temperatures may excessively affect the energizing period of the electromagnet L, and accordingly, there is no anxiety of defective double-frame shooting when the one-frame shooting operation is selected.

Next, a modified example of the present invention is described with reference to FIG. 4, wherein a diode D is embloyed in place of the charging resistor R0 of FIG. 2. Namely, the diode D is connected between the emitter and the base of the transistor T, so that the total resistance impeding the charging current of the capacitor C is far smaller in comparison with that of the circuit of FIG. 2. Incidentally, due to the high reverse resistance of the diode D, the discharging current does not flow through the diode D. Other parts indicated by the same symbols with those in FIG. 2 operate identically to those referred to in FIG. 2.

Next, a further modified example of the present invention is described with reference to FIG. 5, wherein a second transistor T1 is employed in place of the resistor R0 of FIG. 2. Namely, the emitter of said second transistor T1 is connected to the base of the first transistor T, the base of the second transistor T1 is connected to the emitter of the first transistor T, and the collectors of both transistors T and T1 are connected in common. Accordingly, in the one-frame shooting operation, when the release switch Sr is opened, the base of said second transistor T1 receives the high voltage of the power source +E through the resistor R2, and therefore, the charging current to the capacitor C flows through the collector and the emitter of said second transistor T1. Due to said high voltage impressed to its base, the transistor T1 is highly conductive during the charging period, and therefore, the charging can be made within a very short time.

A further modified example of the present invention is explained with reference to FIG. 6, wherein a circuit including a unijunction transistor T2 is inserted between the two transistors T1 and T of FIG. 5 as a prestage to the transistor T. Also, two interlocked switches Sc1 and Sc2 are provided for selecting the following operations:

position (a) — for continuous shooting
position (b) — for one-frame shooting
position (c) — for low speed shooting.

When the switches Sc1 and Sc2 are in their (a) positions, the electromagnet L is connected in series to the resistor R3 like the foregoing examples shown in FIGS. 2, 4, and 5, and accordingly, the camera functions for continuous shooting.

When the switches Sc1 and Sc2 are in their (b) positions, the emitter bias resistors VR and R4 are disconnected from the power source terminal +E. The unijunction transistor T2 does not substantially affect operation of the circuit for the following reason. The capacitor C has been preliminarily charged up to the voltage of the power source through a path formed by the electromagnet L, the resistor R5, the bases of the unijunction transistor T2, the resistor R6, the base and the emitter of the transistor T1, and finally the resistor R1. Accordingly, upon closing of the release switch Sr, the emitter and base 2 of the unijunction transistor T2 becomes conductive, and therefore a large current flows through the resistor R6, causing a voltage drop across the resistor R6. As a result, the transistor T becomes conductive. After the capacitor C has completely discharged through the emitter of the unijunction transistor T2, the capacitor C is not charged so long as the release switch Sr is closed. Therefore, the transistors T2 and T remain non-conductive. Accordingly, the circuit functions substantially similar to the circuit of FIG. 5 with the switch Sc opened, and one-frame shooting is accomplished.

When the switches Sc1 and Sc2 are in their (c) positions, the emitter bias resistors VR and R4 are connected to the power source terminal +E through the contact (c) of the switch Sc2 and the electromagnet L. Therefore, a positive bias voltage is impressed on the emitter of the transistor T2, and the circuit constants of the circuit consisting of the unijunction transistor T2 and the resistors R1, VR, R4, R5 and R6 and the capacitor C are selected to form a known relaxation oscillator of very low frequency.

The capacitor C is charged through the resistors VR and R4, and when the voltage charge of the capacitor C reaches a predetermined level, the unijunction transistor T2 becomes conductive to discharge the capacitor C. When the discharging is complete, the capacitor C is again charged through the resistors VR and R4. Namely, the capacitor C, the unijunction transistor T2, the resistors VR and R4 constitute a relaxation oscillator. The transistor T becomes conductive only while the unijunction transistor T2 is conductive, and the electromagnet L is energized during the same time. Accordingly, the last-stage transistor T is repeatedly turned on with a certain interval inbetween, and the shutter is opened repeatedly with said certain interval inbetween. The interval of the repeated opening of the shutter can be changed by adjusting the variable resistor VR of the bias circuit. Such repeated shooting with intervals can be employed for low speed shooting, i.e., so-called fast motion shooting or memo motion filming.

What is claimed is:

1. In a motion picture camera including an optical system, means for providing a D.C. source voltage, a film driving mechanism, a rotatable shutter for exposure of the film, an electromagnet for controlling the rotation of the shutter by its energization, a control means for energizing said electromagnet by a current which temporarily flows through said control means when said control means receives a pulse for effecting one-frame shooting, and a by-pass branch for by-passing said control means for continuously energizing said electromagnet by a by-pass current flowing through said by-pass branch in a continuous shooting, an electronic circuit for providing said control means with said pulse, comprising:
a. first and second terminals between which the D.C. source voltage for said electronic circuit is impressed;
b. a third terminal;
c. a release switch connected between said second and third terminals;
d. a relaxation oscillator connected between said first and third terminals and having a capacitor connected at one end thereof to said second terminal and a discharging means for discharging said capacitor when the voltage across the capacitor exceeds a preset level with said release switch closed, to apply said pulse to said control means;
e. first charging means for charging said capacitor and having a gating means having first, second and third connection points, said first terminal being connected to the first connection point of said gating means and the second connection point of said gating means being connected to the other end of said capacitor;

f. gate control means comprising a first signal path between said first and third terminals and a second signal path between said third terminal and the third connection point of said gating means, said gate control means controlling said gating means so as to permit charging through said first charging means, to said capacitor under the condition that said release switch is opened and to block said charging under the condition that said release switch is closed; and g. second charging means for charging said capacitor comprising a control switch and a variable resistor connected in series with each other between said first terminal and said other end of said capacitor, whereby said second charging means continuously charges said capacitor under the condition that said control switch is closed and thereby said relaxation oscillator periodically applies said pulse to said control means at intervals determined by the RC time constant of said variable resistor and said capacitor.

2. The motion picture camera of claim 1, wherein said by-pass branch comprises a resistor and a switch connected in series with each other.

3. The motion picture camera of claim 1, wherein said gating means is a transistor, said first connection is an electrical connection from said first terminal to the collector of said transistor and the second connection is an electrical connection from the emitter of said transistor to said other end of said capacitor, and said second signal path is a connection from said third terminal to the base of said transistor.

4. The motion picture camera of claim 1, wherein said control means comprises a power transistor for energizing said electromagnet by the collector current thereof which temporarily flows when said power transistor receives said pulse at the base thereof.

5. The motion picture camera of claim 4, wherein said relaxation oscillator comprises a unijunction transistor having a first base connected to the base of said power transistor, a second base connected to said first terminal and an emitter connected to said other end of said capacitor, and a resistor connected between said first base and said third terminal.

6. The motion picture camera of claim 5, wherein a junction between said first and said second bases in said unijunction transistor and said resistor connected to said first base further serve as said first signal path between said first and third terminals.

7. In a motion picture camera including an optical system, a film driving mechanism, means for providing a source voltage, a rotatable shutter for exposure of the film, and an electromagnet for controlling the rotation of the shutter by its energization, an electronic circuit for controlling said electromagnet comprising:

a. first and second terminals across which the source voltage for operating said electronic circuit is impressed;

b. a third terminal;

c. a release switch connected between said second and third terminals;

d. a transistor connected at its collector to said first terminal and at its base to said third terminal;

e. a first resistor connected between said first and third terminals;

f. a capacitor connected between the emitter of said transistor and said second terminal;

g. a discharging means having two terminals, one terminal of said discharging means being connected to an end of said capacitor at which side the emitter of said transistor is connected, and the other terminal of said discharging means being connected to said third terminal, said discharging means discharging said capacitor under the condition that said release switch is closed and that the voltage across said capacitor exceeds a preset level, to produce a pulse which effects a temporary energization of the electromagnet; and h. a by-passing branch including a second resistor and a switch connected in series with each other between said first and third terminals for continuously energizing said electromagnet when said switch is closed.

8. The motion picture camera of claim 7, wherein said discharging means comprises control transistor having its collector connected to said first terminal through said electromagnet, its emitter connected to said third terminal and its base connected to said one end of the capacitor.

9. The motion picture camera of claim 7, wherein said discharging means comprises a unijunction transistor connected at its first base to said third terminal through said first resistor at its second base to said first terminal and at its emitter to said one side of said capacitor, and said camera further comprises a variable resistor and a switch connected in series with each other between said first terminal and said one side of the capacitor.

10. The motion picture camera of claim 9, further comprising a control transistor connected at its collector to said first terminal through said electromagnet, at its emitter to said third terminal and at its base to said first base of the unijunction transistor for temporarily energizing said electromagnet in response to said pulse from said discharging means.

11. In a motion picture camera including an optical system, a film driving mechanism, means for providing a source voltage, a rotatable shutter for exposure of the film, and an electromagnet for controlling the rotation of the shutter by its energization, an electronic circuit for controlling said electromagnet comprising:

a. a first and second terminal across which the source voltage for operating said electronic circuit is impressed;

b. a third terminal;

c. a release switch connected between said second and third terminals;

d. a control transistor connected at its collector to said first terminal through said electromagnet and at its emitter to said third terminal;

e. a capacitor connected between the base of the control transistor and said second terminal;

f. a charging means including a resistor connected between said first terminal and said third terminals, and a connection between said third terminal and one side of said capacitor to which the base of said control transistor is connected; and g. a by-pass branch including a resistor and a switch connected in series with each other across the collector and emitter of said control transistor.

12. The motion picture camera of claim 11, wherein said connection comprises a resistor.

13. The motion picture camera of claim 11 wherein said connection comprises a diode connected at its anode to said third terminal and at its cathode connected to said one side of the capacitor.

14. In a motion picture camera including an optical system, a D.C. power source, a film driving mechanism, a shutter release button, a rotatable shutter for periodic exposure of the film, and an electromagnet for controlling the rotation of the shutter by its energization, an electronic circuit for controlling said electromagnet comprising a control transistor and a release switch connected in series with said electromagnet across said D.C. power source, said release switch being connected between the emitter of said control transistor and one side of said D.C. power source and being interlocked with said shutter release button to be closed when the button is actuated, a by-pass branch including a first resistor and a control switch for selecting between continuous shooting and one-frame shooting connected from the collector to the emitter of said control transistor to by-pass said control transistor when continuous shooting is selected, a capacitor, a second transistor for controlling the charging of said capacitor, said capacitor being connected between the emitter of said second transistor and said one side of said D.C. power source so as to form a charging path from the collector through the emitter of said second transitor to said capacitor, control path means for controlling the charging of said capacitor, by feeding a current to the base of said second transistor said control path means including a first path from the other side of said D.C. power source to the emitter of said control transistor and a second path from said emitter to the base of said second transistor, relaxation oscillator means including at least said capacitor for applying a pulse to the base of said control transistor while discharging said capacitor when the voltage between the emitters of said control transistor and said second transistor exceeds a preset level, and a charging path formed by a variable resistor and a third switch connected in series between said capacitor and the side of said D.C. power source to which the collector of said control transistor is connected.

* * * * *